United States Patent Office 3,061,530
Patented Oct. 30, 1962

3,061,530
TREATMENT OF ARTICLES FORMED FROM LINEAR POLYMERIZATION OR POLYCONDENSATION PRODUCTS
Victor Emanuel Gonsalves, Arnhem, Netherlands, assignor to American Enka Corporation, Enka, N.C., a corporation of Delaware
No Drawing. Filed June 3, 1957, Ser. No. 663,009
Claims priority, application Netherlands June 16, 1956
1 Claim. (Cl. 204—154)

This invention relates generally to the treatment of articles formed from linear polymerization or polycondensation products and more particularly to an improved method of subjecting such articles to ionizing rays by means of irradiation and to the improved article produced by said method.

It is generally known that the quality of threads, fibers, bands, films and other articles formed from linear polymerization or polycondensation products, polyamides in particular, may be improved by irradiating the same with ionizing rays such as electrons. After treatment in this manner, it has been found that the articles are more resistant to the action of substances usually having a solubilizing and swelling effect thereon, as well as being more resistant to the effect of heat.

It has been shown, however, that this ionizing irradiation attacks and weakens the polymers to a great extent, this resulting in an undesirable product, especially if high strength is desired. It is frequently necessary, therefore, to increase the dimensions of articles over those desired merely in order to compensate for this weakening during irradiation.

Irradiation of articles according to known methods has also been found to result in a decrease in the tendency of the articles to shrink when exposed to elevated temperatures. Although this is generally considered to be desirable, it was further found that the decrease in tendency to shrink obtained by known methods of irradiation soon reaches a maximum and that a further decrease cannot be obtained, even after prolonged periods of irradiation, without increasing the force necessary to prevent shrinking (hereinafter referred to as shrinking tension) beyond an acceptable upper limit.

An object of the present invention, therefore, is to provide a method of treating articles by irradiation not having the disadvantages of known methods.

A further object of this invention is to provide a method for treating articles by irradiation which results in a decrease in shrinking tension beyond that which can be obtained by known methods.

Another object of the present invention is to provide a method for treating articles by irradiation through the use of which loss in strength may be limited as the result of a greater decrease in shrinking tension than that heretofore attainable.

Still another object of the present invention is to produce an irradiated article formed from linear polymerization or polycondensation products and having improved qualities.

Other objects and advantages will become apparent upon study of the following detailed disclosure.

In accordance with the preferred embodiment of this invention, an article formed from linear polymerization or polycondensation products is subjected to a liquid treatment for a sufficient length of time to ensure at least partial swelling thereof, after which the article is treated by irradiation with ionizing rays, or by exposure to a high energy ionizing irradiation.

This combined swelling and irradiation treatment results in a decrease of the shrinking tension exceeding that which can be obtained with an irradiation treatment only. The concomitant reduced loss of strength in the treated article is due not only to the swollen condition in which it was irradiated but also to the fact that the amount or charge of irradiation in the method according to this invention may be less than that which is usually necessary in known irradiation methods.

While not being limited thereto, this invention is of particular importance in connection with the manufacture of tire yarn. In the manufacture of reinforced rubber articles, such as tires, the same usually are subjected to very high temperatures during the vulcanization process, which process is necessary in order to bond the reinforcement material to the rubber. An acute problem occurs if the reinforcement material, such as tire cord, is formed from polymerization and polycondensation products having an inherent tendency to shrink at high temperatures. An excessive shrinking tension, which, as defined herein, is the force resulting from the tendency of the tire cord to shrink, may actually result in deformation of the reinforced tire. By virtue of the combined treatment according to the present invention, it has been found that the shrinking tension of the treated tire cord has been reduced sufficiently to eliminate the above-mentioned disadvantage. With regard to the tension to which the threads, bands and films are subjected during the combined treatment discussed herein, it is preferred that the amount of tension applied be less than that which is necessary to deform these articles. Higher or lower tensions may of course be applied, although this is less desirable.

The invention will be illustrated further with reference to the following specific example.

*Example*

An 840 denier thread, consisting of polyhexamethylene adipic acid amide, was wound onto an elastic spool and immersed in water of 20° C. The thread was allowed to remain in the water for 24 hours, during which time the swelling or water absorption reached complete equilibrium. At the end of this period, the thread was removed from the elastic spool and led in a helical path around two non-parallel rollers at a velocity of 4 m./min. and under a tension of 50 g. The portion of thread successively extending between said rollers was irradiated with a dose of $5 \times 10^6$ rep. of electrons. The rep., or Röntgen equivalent physical, is a unit often used to measure the dose of irradiation. A rep. may be defined as the amount of irradiation necessary in order that 83 ergs be absorbed by one cm.$^3$ of water. According to W. E. Siri, in Isotopic Tracers and Nuclear Radiations, New York, 1949, page 412, 1.1 rep. equals one Röntgen. Since one erg is equal to $1/1.6 \times 10^{12}$ electron volts (see for example College Technical Physics by Weber, White and Manning, page 718, published in 1947 by McGraw-Hill Book Co., Inc.), the aforesaid dose of $5 \times 10^6$ rep. (ergs per cm.$^3$) of electrons is equivalent to $260 \times 10^{18}$ electron volts per cm.$^3$ After irradiation, the thread was wound into strand form, which strand was dried in freely hanging loops and conditioned in an atmosphere with a relative humidity of 65%. The shrinking tension of the thread at 145° C. was next determined. This was accomplished by measuring the force necessary to prevent shrinking of the thread at that temperature, which force has been defined herein as the shrinking tension. Further, the strength of thread treated at 20° C. and conditioned in an atmosphere with a relative humidity of 65% was compared with the strength of a similar but untreated thread conditioned under the same circumstances. The difference in strength was of course the loss of strength due to irradiation.

In the following table, not only are the results of the foregoing measurements included but also those results obtained on the untreated thread and on thread which had been irradiated only in a dry condition or which had been only slightly swollen, respectively.

| Condition of The Thread | Shrinking tension (determined at 145°C.), g. | Loss of Strength, percent |
|---|---|---|
| Not treated | 275 | |
| Swollen in water | 175 | 2 |
| Irradiated with electrons having a dose of 5×10⁷ rep. in an unswollen condition | 150 | 40 |
| Swollen in water and irradiated with electrons having a dose of 5×10⁶ rep | 100 | 10 |

The shrinking tension of 100 g./840 denier thread formed from linear polymerization or polycondensation products is comparable to the shrinking tension of cellulose rayon.

The combined treatment according to this invention may be applied to articles formed from linear polymerization or polycondensation products in most of the different forms. For example, threads, fibers, bands, foils and films may be treated in this manner. In view of the small thickness of these articles they may be swollen easily in at least one direction and also may be irradiated homogeneously. The same also applies to hollow articles having thin walls, such as bottles and capsules. Greater difficulties are encountered, of course, with relatively thick articles such as gear wheels or bearings, but in treating these articles a superficial swelling and an irradiation penetrating only the surface usually will suffice. In all of these instances, irradiation from different directions, either simultaneously or alternately, is possible.

The articles need not be treated in intermediate form, but may be converted into the final product first. For example, threads and fibers need not be treated as such but may, if desired, be subjected to the combined swelling and irradiation treatment after having been woven or knitted into fabrics or after having been plyed into cords, especially tire cord.

Although the articles may be subjected to treatment according to this invention before final plastic deformation, for instance, before stretching at elevated or at room temperature, it is advisable to carry out the combined swelling and irradiation treatment, if possible, only after the final plastic deformation has been completed.

Polyvinyl compounds and polyethylene are examples of polymerization products to which the present combined treatment may be applied. The term linear polycondensation products is intended to include not only polyamides but also polyurethanes and polyesters. As polyamides, the condensation products of diamines and dicarboxylic acids, as well as of $\omega$-aminocarboxylic acids are suitable for this treatment. Moreover, mixtures of said macromolecular products, as well as copolymers and copolycondensation products, may be subjected to the treatment disclosed herein.

As mentioned hereinabove, in order to obtain the desired effect it is necessary that the articles be brought into a slightly swollen condition. Although complete equilibrium of swelling is preferred, a suitable swollen condition has been obtained if, after drying, the treated article does not decrease more than 20% in strength. This condition may be brought about by a number of methods. For example, a weakly acting swelling agent may be used, which agent evaporates upon drying of the swollen article. Swelling agents suitable for this function may be water or alcohols, such as methanol, ethanol and cyclohexanol.

Furthermore, swelling agents of the type which do not evaporate entirely upon drying may also be used. If that portion of these agents which remains after drying becomes troublesome, the same may be washed out of the article by volatile liquids which are inert or have a weak swelling action. This situation may arise when mixtures of swelling agents are used to perform the swelling function. The so-called "carriers," which favor the absorption of dyes when dyeing hydrophobic polymers, are suitable substances for obtaining the slightly swollen condition. Moreover, it is also possible to obtain the slightly swollen condition with the aid of stronger swelling agents and even with solvents. In the former case, it is of course necessary to stop action of the swelling agents as soon as a slightly swollen condition has been reached.

Additionally, it may be desired to utilize a swelling agent which is ineffective at room temperature but which operates at higher temperatures, such as formamide. In this case, the polymerization or the polycondensation product may be impregnated directly with the hot swelling agent, whereupon immediate swelling will occur, or this product may be first impregnated with a cold swelling agent and then heated in order to obtain the swollen condition.

Although, according to the preferred embodiment of this invention, articles formed from polymerization or polycondensation products are subjected to irradiation by electrons, a treatment with other ionizing rays, such as neutrons, gamma rays, Röntgen rays, protons and helium ions, is also contemplated. The irradiation may be carried out most simply in air at normal or room temperature. The irradiation may take place, however, at higher or lower temperatures, for example, at temperatures exceeding 100° C. or below 0° C., as well as at increased or decreased pressures. Moreover, in order to prevent decomposition of the polymer, the processing may be carried out entirely or partly in the presence of an inert gas or of anti-oxidants.

The present invention may be practiced in many different ways. Although it is preferred that the article be irradiated while in a swollen condition, as discussed above, it is possible to swell the article slightly, then dry the same, and finally to subject the article to irradiation. This embodiment of the invention, however, has been found to produce less satisfactory results than the preferred embodiment. It is also possible to utilize swelling agents which react under the influence of the ionizing rays, this resulting in a simultaneous swelling and irradiation treatment. In addition to the chemically inert swelling agents, use is also contemplated of substances having a swelling atcion which will react with the polycondensation products under the influence of the electrons and form cross-links between the molecules. As an example, 1-hydroxy-2,5-dichloromethylbenzene may be used in connection with polyamides, while acrylonitrile may be used with polyethylene.

Although a number of embodiments have been discussed for explanatory purposes, it is to be understood that this invention is limited only to the extent specified in the following claim.

What is claimed is:

A method of treating tire cord formed from polyhexamethylene adipic acid amide comprising the steps of immersing the cord in water until swelling reaches equilibrium while preventing reduction in strength of the untreated cord by more than 20%, and thereafter irradiating the swollen cord with electrons having a dose of $260 \times 10^{18}$ electron volts per cm.³ in order to render said cord more resistant to heat and to substances normally having solubilizing and swelling effects thereon without substantially impairing the strength thereof.

References Cited in the file of this patent

UNITED STATES PATENTS

| | | |
|---|---|---|
| 2,863,812 | Graham | Dec. 9, 1958 |
| 2,897,092 | Miller | July 28, 1959 |

FOREIGN PATENTS

| | | |
|---|---|---|
| 730,476 | Great Britain | May 25, 1955 |
| 64,800 | France | June 29, 1955 |
| | (3d addition to No. 1,079,401) | |
| 66,034 | France | Dec. 12, 1955 |
| | (4th addition to No. 1,079,401) | |
| 1,130,099 | France | Sept. 17, 1956 |

OTHER REFERENCES

Chapiro: "J. de Chimie Physique," volume 47, pages 747–775 (1950).

"J. Polymer Science," pages 219–224, January 1956.

"Brookhaven National Lab. Report No. 414," pages 1–14, October 1956.